G. A. Riedel.

Steam Generator.

No. 3,611. Reissued Aug. 17, 1869.

Witnesses.
Willard. Emery
Alonzo F. Shaw

Inventor.
G. Adolph Riedel
By his attorney
E. Spencer Ketrick

McPETERS, PHOTO-LITHOGRAPHER, WASHINGTON, D. C.

UNITED STATES PATENT OFFICE.

JAMES P. WOOD AND JOSEPH WOOD, OF PHILADELPHIA, PENNSYLVANIA, AND WILLIAM E. WOOD AND CHARLES J. WOOD, OF BALTIMORE, MARYLAND, ASSIGNEES OF G. ADOLPH RIEDEL.

IMPROVEMENT IN STEAM-GENERATORS.

Specification forming part of Letters Patent No. 87,294, dated February 23, 1869; ante dated February 12, 1869; Reissue No. 3,611, dated August 17, 1869.

*To all whom it may concern:*

Be it known that G. ADOLPH RIEDEL, of the city and county of Philadelphia, and State of Pennsylvania, did invent a new and useful Improvement in Steam-Boilers; and we hereby declare that the following is a full and exact description thereof, reference being had to the accompanying drawings, and to the letters of reference marked thereon.

The nature of this invention consists, in the first place, of a cast-iron steam-generator, made in sections, each of which has one or more hollow rims and hollow spokes or hollow cross-bars, the sections being held together by means of bolts or screws in any convenient manner.

In the second place, it consists of a water-drum, formed by means of short tubes or pipes at the lower part of the sections, for the purpose of forming an open communication between the same for the free circulation of the water through them, the drum being so arranged in relation to the rims as to insure an equal expansion and contraction of the metal in it and the latter.

In the third place, it consists in the use of flexible pipes in the combination of a steam-drum with the said sections to prevent the drum being strained by the unequal expansion and contraction of the different sections.

In the fourth place, it consists in the formation of return-flues between the sections, by means of annular ribs, for the passage of the products of combustion.

In the fifth place, it consists in the construction of the sections with man holes on a line with each hollow spoke or hollow cross-bar, to cause the transmission of light through the same when open, so as to show the condition of the sections when inspected.

Figure 1:
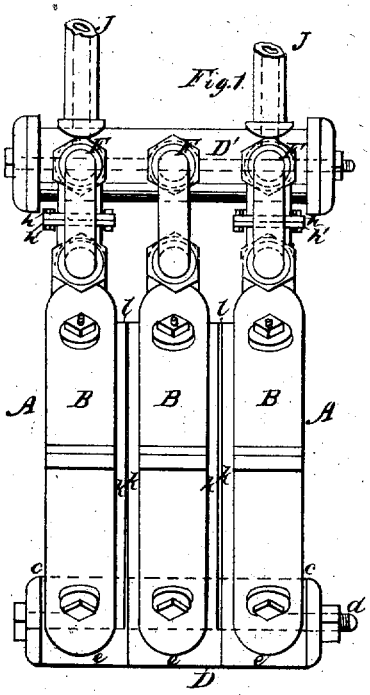
Figure 2:
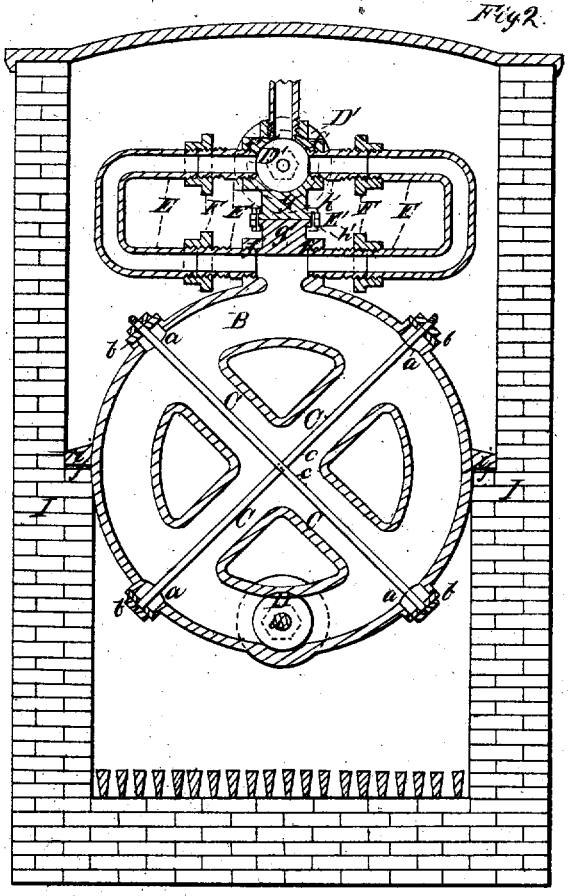
Figure 4:
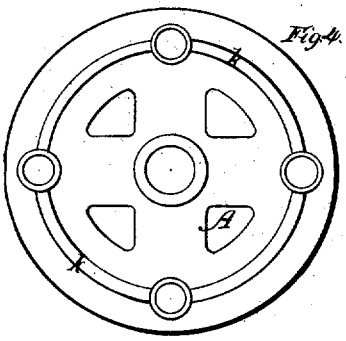
Figure 3:
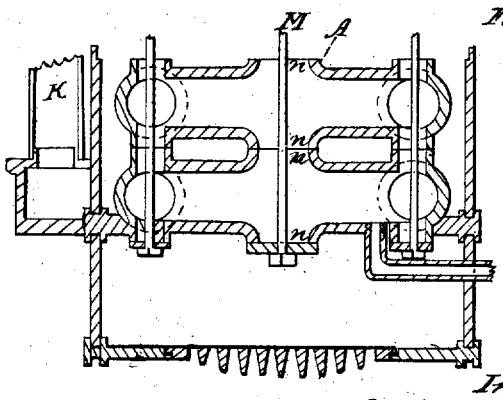

In the accompanying drawings, which make a part of this specification, Figure 1 is an elevation of the improved boiler or steam-generator. Fig. 2 is a vertical section at the line *x x* of Fig. 1. Fig. 3 is a vertical section of a modified form of the boiler, in which the sections A are placed horizontally. Fig. 4 is a side view of one of the sections A.

Like letters in all the figures indicate the same parts.

A A A, Fig. 1, represent three sections of the boiler part of the apparatus, which may have any desirable number of sections. They are so constructed as to have an open communication between them for the free circulation of the water, and are confined together by means of bolts or screws, as hereinafter described.

The rims B of the sections A are represented in the drawings of circular form on their periphery, yet they will answer the purpose when made in elliptical or other forms, and instead of their being circular in their cross-sections, they may be corrugated, or they may be composed of a series of chambers of globular or other form. There are hollow spokes C connected with the rims B, or with a plurality of rims, in the same plane, if desired. In the outer periphery of the rims there are man-holes *a* on a line with two spokes, respectively, there being an even number of spokes, so as to admit of light passing clear through each section at different points for the purpose of discovering the condition of the boiler when inspected from the outside. The man-holes are provided with doors or covers *b*, which are confined by means of screw-bolts *c*, one bolt holding two opposite doors, as shown in Fig. 2. The doors may, however, be confined by separate bolts, if desired, in the usual manner. When desired, hollow cross-bars may take the place of the spokes; but the former, as they increase the strength of the sections and cause the light to fall more thoroughly on the interior of the rim, are preferable.

At the bottom of the sections A there are cross tubes or pipes *e*, which form a hollow drum, D, when the sections are connected together. The object of said drum is to provide for a free circulation of water throughout the entire boiler, whereby to keep it at the same height in all the sections. The drum is on a line, or nearly so, with the periphery of the sections, and is so constructed as to insure an equal expansion and contraction of the metal in it and the sections, or nearly so, to prevent a straining of the parts. The sections are confined together by means of the bolt *d*, or they may be secured by means of short bolts by constructing them with flanges at their ends.

D′ is a steam-drum, which is placed above the sections A, and connected therewith by means of the steam-pipes E, which are made in sections and connected together by means of the couplings F, the inner ends of the short pieces E′ being secured in the necks *f* on the upper edges of the sections A and the necks *f′* of the drum D′. The drum has projections *g*, whose flange *h* is bolted to the flange *h′* of the projection *g′*. This construction and arrangement of the pipes E give great flexibility thereto, to compensate for any variations which may occur in the expansion and contraction of the different sections A, and thus prevent strain upon the steam-drum D′ and water drum D, and also upon the sections.

The pipes E may be made of cast-iron, if desired. In this case the couplings F can be dispensed with by having flanges at their ends and similar flanges on the necks *f* and *f′* and connecting them by means of screw-bolts.

The condensed steam is conveyed down from the drum D′ into the sections A by means of suitable pipes, (not shown in the drawings,) outside of the necks *f*, or it may pass into the sections through vertical openings in the necks *g g′*.

The sections A are provided with lugs *i*, which rest on the ledges *j* of the walls I I of the furnace, as seen in Fig. 2. They are constructed also with annular ribs *k*, which nearly touch each other, there being a small slot, *l*, between the contiguous sections to allow for the expansion of the metal. The object of the ribs is to form return-flues for the passage of the products of combustion. If desired, the ribs may be dispensed with, but when they are used there should be doors at the bottom of the sections to provide for cleaning out the flues.

One of the pipes J is for the connection of a safety-valve, and the other to connect the steam-discharge pipe.

The spokes C or hollow cross-bars may have ribs running in any direction to form flues.

A check-valve may be set between the contiguous sections A in any convenient place, to cut off the communications between the sections in case of an explosion.

A modified form of the boiler is represented in Fig. 3, which is a vertical section.

The sections A are confined together by means of bolts M, which pass through the hollow bosses *n*, which form continuous tubes or pipes, as seen in Fig. 3. A face view of one of the sections A is represented in Fig. 4.

K is the smoke-pipe.

We do not claim anything contained in the patents of Augustus W. Newell, dated December 24, 1867; of George W. Field, dated June 23, 1868, and Thomas S. Clogston, dated June 18, 1867; but

What we claim as new, and desire to secure by Letters Patent, is—

1. The construction and arrangement of the hollow rims B, with the openings forming the drum D, hollow spokes C, and flexible pipes E, substantially as herein set forth.

2. The construction of the annular ribs *k*, when arranged with the rims B for the purpose of forming return-flues for the products of combustion, substantially as described.

3. The arrangement of the man-hole plates *b* and rods *c* with the rims B and hollow spokes C, substantially as and for the purpose above described.

JAMES P. WOOD. [L. S.]
JOSEPH WOOD. [L. S.]
WILLIAM E. WOOD. [L. S.]
CHAS. J. WOOD. [L. S.]

Witnesses to the signatures of James P. Wood and Joseph Wood:

DAN'L S. HINKLE,
GEORGE B. SCOTT.

Witnesses to the signatures of William E. Wood and Charles J. Wood:

ALVA HUBBARD,
W. H. MCCABE.